United States Patent
Park

(10) Patent No.: US 9,909,034 B2
(45) Date of Patent: Mar. 6, 2018

(54) METHOD FOR BONDING FABRIC OR SHEET-TYPE INDUSTRIAL MATERIALS TO EACH OTHER

(71) Applicant: Heedae Park, Busan (KR)

(72) Inventor: Heedae Park, Busan (KR)

(*) Notice: Subject to any disclaimer, the term of this patent is extended or adjusted under 35 U.S.C. 154(b) by 0 days.

(21) Appl. No.: 14/977,944

(22) Filed: Dec. 22, 2015

(65) Prior Publication Data
US 2016/0289503 A1 Oct. 6, 2016

(30) Foreign Application Priority Data

Apr. 3, 2015 (KR) .................. 10-2015-0047310

(51) Int. Cl.
| | |
|---|---|
| C09J 5/06 | (2006.01) |
| A43D 25/18 | (2006.01) |
| A41D 27/24 | (2006.01) |
| A43B 3/00 | (2006.01) |
| A43B 9/12 | (2006.01) |

(52) U.S. Cl.
CPC .............. *C09J 5/06* (2013.01); *A41D 27/245* (2013.01); *A43B 3/0078* (2013.01); *A43B 9/12* (2013.01); *A43D 25/181* (2013.01); *C09J 2205/114* (2013.01); *C09J 2400/263* (2013.01); *C09J 2423/04* (2013.01); *C09J 2431/00* (2013.01); *C09J 2467/00* (2013.01); *C09J 2475/00* (2013.01); *C09J 2477/00* (2013.01)

(58) Field of Classification Search
CPC ......... C09J 5/06; A41D 27/245; A43D 25/181
See application file for complete search history.

(56) References Cited

U.S. PATENT DOCUMENTS

| | | | | |
|---|---|---|---|---|
| 6,660,376 | B1* | 12/2003 | Zimmel | C08G 18/12 428/304.4 |
| 2009/0224431 | A1* | 9/2009 | Larsen | B29C 37/0032 264/328.14 |

* cited by examiner

*Primary Examiner* — Daniel H Lee
(74) *Attorney, Agent, or Firm* — Park & Associates IP Law, P.C.

(57) ABSTRACT

The present invention relates to a method for bonding shoe textiles or industrial textiles to each other, the method including the steps of: melting an adhesive resin to apply the adhesive resin to the surface of a partial coating roller having a desired pattern engraved thereon, the adhesive resin being any one selected from the group consisting of urethane resin, an EVA resin, a nylon resin, and a polyester resin; transferring the melted adhesive resin applied to the partial coating roller to the textile; and bonding the textile to which the melted adhesive resin is transferred to another textile.

1 Claim, 1 Drawing Sheet

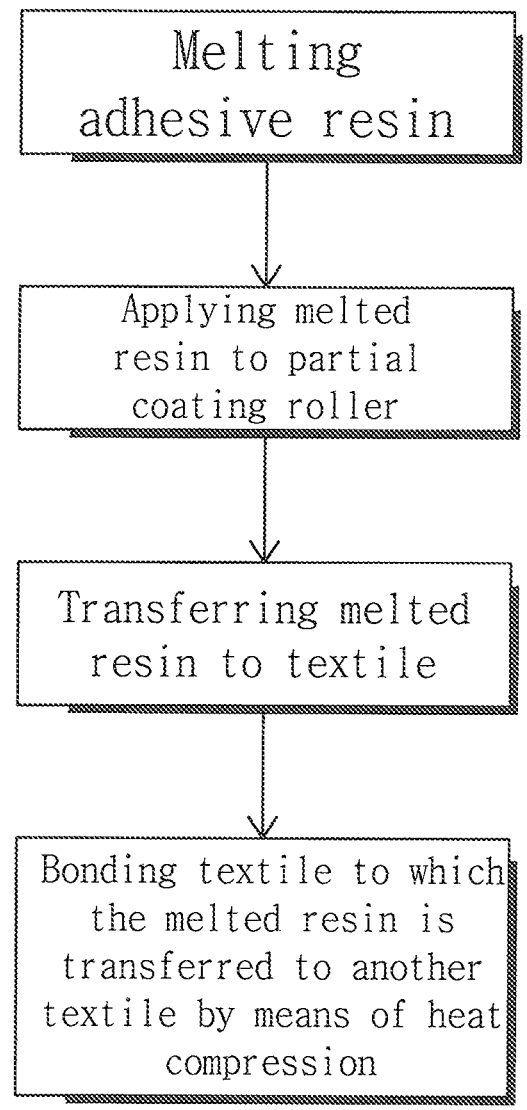

though the attached FIGURE so as to achieve the technical
METHOD FOR BONDING FABRIC OR SHEET-TYPE INDUSTRIAL MATERIALS TO EACH OTHER

REFERENCE TO RELATED APPLICATIONS

This application claims the priority benefit of Korean Patent Application No. 10-2015-0047310 filed on Apr. 3, 2015, the entire contents of which are incorporated herein by reference.

FIELD OF THE INVENTION

The present invention relates to a method for bonding fabric or sheet-type industrial materials (e.g., shoe sole) to each other, and more particularly, to a method for bonding fabric or sheet-type industrial materials to each other, that is capable of minimizing scraps generated when the sheet-type materials are bonded to each other and further capable of providing lightweight products and cost saving effects.

BACKGROUND OF THE INVENTION

As well known, adhesive films used in bonding processes of shoes or industrial textiles have been continuously increased in quantities used because, unlike conventional solvents used as adhesives, they are eco-friendly and manufactured in an automation system.

The adhesive film is a flat plate-shaped film made by means of extrusion of an adhesive resin, and so as to bond shoe or industrial textiles to each other, accordingly, the flat plate-shaped film is necessarily cut off and bonded to an adherend (that is, the textile). Next, the adherend is compressedly bonded to another textile by means of a press machine to which heat and pressure are injected.

In case of the conventional textile bonding method, however, the adhesive film should be always cut off, which undesirably causes film scraps to be unnecessarily increased. Further, release paper has to be necessarily used for the pressing so that after the completion of the pressing, the release paper attached to the adhesive film should be removed and discarded as waste.

SUMMARY OF THE INVENTION

Accordingly, the present invention has been made in view of the above-mentioned problems occurring in the prior art, and it is an object of the present invention to provide a method for bonding shoe or industrial textiles to each other that is capable of allowing an adhesive resin to be applied only to a desired portion of a textile to bond the textile to which the adhesive resin is applied to another textile, thus minimizing scraps, providing lightweight products, and achieving cost saving effects.

It is another object of the present invention to provide a method for bonding shoe or industrial textiles to each other that includes the steps of melting an adhesive resin to apply the melted adhesive resin to a coating roller on which a variety of patterns are engraved, transferring the adhesive resin applied to the coating roller to a textile, and bonding the textile to which the adhesive resin is applied to another textile by means of heat and pressure.

To accomplish the above-mentioned objects, according to the present invention, there is provided a method for bonding shoe or industrial textiles to each other, the method including the steps of: melting an adhesive resin to apply the melted adhesive resin to a partial coating roller having a desired pattern engraved on the surface thereof, the adhesive resin being any one selected from the group consisting of a urethane resin, an EVA resin, a nylon resin, and a polyester resin; transferring the melted adhesive resin applied to the partial coating roller to the textile; and bonding the textile to which the melted adhesive resin is transferred to another textile.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a flowchart showing a method for bonding shoe or industrial textiles to each other according to the present invention.

DETAILED DESCRIPTION OF THE INVENTION

Hereinafter, an explanation on a method for bonding shoe or industrial textiles to each other according to the present invention will be in detail given with reference to the attached drawing. In the detailed description, a preferred embodiment of the present invention will be suggested through the attached FIGURE so as to achieve the technical solutions of the present invention. On the other hand, other preferred embodiments of the present invention will be suggested just through explanation.

According to the present invention, the shoe or industrial textiles are bonded to each other, without having any adhesive film used in the conventional practice. In more detail, a method for bonding shoe or industrial textiles to each other according to the present invention includes the steps of melting an adhesive resin to apply the melted adhesive resin to a coating roller having a desired pattern engraved on the surface thereof, transferring the adhesive resin applied to the coating roller to a textile passing through the coating roller, and bonding the textile to which the adhesive resin is transferred to another textile by means of heat and pressure.

The textile bonding method according to the present invention allows the adhesive resin to be applied only to a desired portion of the textile and then bonds the adherend to another textile, thus producing no scraps because adhesive films used in conventional textile bonding methods are not needed and further generating no waste because release paper is not needed. Accordingly, it can be understood that the textile bonding method according to the present invention is eco-friendly.

In addition, the method for bonding shoe or industrial textiles to each other according to the present invention bonds the textiles to each other by means of a relatively small amount of adhesive resin, thus making the textiles after the bonding lightweight, and further, the method according to the present invention allows the adhesive resin to be applied only to a desired portion of the textile, thus expecting the cost saving effects of the finished products.

Hereinafter, an explanation on the method for bonding shoe or industrial textiles to each other according to a first embodiment of the present invention will be in detail given.

FIRST EMBODIMENT

A method for bonding shoe or industrial textiles to each other according to the first embodiment of the present invention is applied to textiles for an upper or insole of a shoe, bedding, and clothing and further applied to industrial textiles. Unlike the conventional method in which an adhesive film is used, a melted adhesive resin is applied to a partial coating roller having a desired pattern engraved on the surface thereof, and after the adhesive resin is transferred to the surface of the textile, the textile is bonded to another textile.

On the other hand, the term 'partial coating roller' used in the present invention means a roller having a desired pattern (for example, having an insole-shaped pattern engraved thereon, or having Nike logo engraved thereon) engraved on the surface thereof.

That is, the partial coating roller has the desired pattern engraved on the surface thereof so that the desired pattern is formed on the surface of the shoe or industrial textile. Accordingly, the melted adhesive resin is applied to the desired pattern engraved on the surface of the partial coating roller, and the adhesive resin is then transferred to the textile. Lastly, the textile to which the adhesive resin is transferred is bonded to another textile.

Hereinafter, the method for bonding shoe or industrial textiles to each other according to the first embodiment of the present invention will be in detail described with reference to FIG. 1.

Referring to FIG. 1, a pellet or dot-like liquid type adhesive resin (such as a urethane resin like a PU or TPU resin, an EVA resin, a nylon resin, a polyester resin and so on) is melted by means of an extruder or a drum type melting machine, and the melted adhesive resin is applied to a partial coating roller (having an insole-shaped pattern engraved thereon). At this time, the melted adhesive resin coated on the surface of the partial coating roller is removed by means of a typical scraper. That is, the melted adhesive resin applied to an entire portion of the partial coating roller except the engraved pattern formed thereof is removed through the typical scraper.

After that, the melted adhesive resin applied to the partial coating roller is transferred to the surface of a textile, and the textile to which the adhesive resin is transferred is bonded to another textile by means of heat and pressure. Next, the textiles are laminated to each other by means of general cooling.

On the other hand, the bonding conditions according to the kinds of resins in the textile bonding method according to the present invention are in detail suggested in Table 1.

TABLE 1

| Conditions | Unit | TPU | EVA | Polyester |
|---|---|---|---|---|
| Temperature of resin melting compressor | ° C. | 180-220 | 150-200 | 130-180 |
| Temperature of partial coating roller | ° C. | 160-200 | 140-180 | 120-160 |
| Rotary speed of partial coating roller | m/min | 2-6 | 3-7 | 3-7 |
| Temperature of adhesive roller | ° C. | 120-160 | 100-140 | 80-120 |
| Pressure of adhesive roller | kgf | 4-8 | 4-8 | 4-8 |

The adhesive roller suggested in Table 1 is a roller for bonding the textile to which the melted adhesive resin is applied to another textile by means of heat and pressure.

On the other hand, the bonding conditions suggested in Table 1 indicate the result values obtained through a lot of tests and they may be varied according to the characteristics of the adhesive resins or the kinds of the textiles to which the melted adhesive resin is applied.

Further, the textile bonding method according to the present invention is adopted in bonding textiles having two layers, and further, of course, the method may be adopted in bonding textiles having three or more layers.

As described above, the method for bonding shoe or industrial textiles to each other according to the present invention allows the melted adhesive resin to be applied only to the engraved pattern formed on the partial coating roller, without having any separate adhesive film used in the conventional method, thus achieving energy saving effects.

Further, the textile bonding method according to the present invention is conducted with no adhesive film, so that the process for discarding scraps and release paper is not needed anymore, thus providing eco-friendly processes, the reduction of the number of processes, and the lightweight products.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for bonding fabric or sheets of industrial materials to each other, the method comprising the steps of:
providing a melted adhesive resin by melting resin material;
applying the melted adhesive resin on an outer surface of a first heated coating roller with a predetermined groove pattern formed on an outer surface thereof, such that the melted adhesive resin is filled in the groove pattern of the first heated coating roller, the predetermined groove pattern depicting a final shape of the bonded fabric or sheets of industrial materials to be produced;
removing the melted adhesive resin from the outer surface of the first heated coating roller except the melted adhesive resin filled in the groove pattern thereof;
transferring the melted adhesive resin in the groove pattern of the first heated coating roller to a first member of fabric or sheets of industrial materials by rolling the first heated coating roller against an outer surface of the first member; and
bonding the first member to which the melted adhesive resin is transferred to a second member of fabric or sheets of industrial materials by rolling a second heated coating roller against the first and second members arranged together, wherein the temperature of the second heated coating roller in said bonding step is lower than the temperature of the first heated coating roller in said transferring step,
wherein the resin material is selected from the group consisting of a polyurethane resin, an EVA resin, a nylon resin, and a polyester resin,
wherein the temperature of the first heated coating roller is between 160° C. and 200° C. when the selected resin material is polyurethane resin, between 140° C. and 180° C. when the selected resin material is EVA resin, and between 120° C. and 160° C. when the selected resin material is polyester resin,
wherein the temperature of the second heated coating roller is between 120° C. and 160° C. when the selected resin material is polyurethane resin, between 100° C. and 140° C. when the selected resin material is EVA resin, and between 80° C. and 120° C. when the selected resin material is polyester resin.

* * * * *